(12) United States Patent
Trauninger

(10) Patent No.: US 7,828,442 B2
(45) Date of Patent: Nov. 9, 2010

(54) FILM-FEEDING MECHANISM

(75) Inventor: Walter Trauninger, Laab im Walde (AT)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 904 days.

(21) Appl. No.: 10/573,613

(22) PCT Filed: Sep. 22, 2004

(86) PCT No.: PCT/DE2004/002154

§ 371 (c)(1),
(2), (4) Date: Feb. 2, 2007

(87) PCT Pub. No.: WO2005/031453

PCT Pub. Date: Apr. 7, 2005

(65) Prior Publication Data

US 2008/0036968 A1    Feb. 14, 2008

(30) Foreign Application Priority Data

Sep. 25, 2003    (DE) .................................. 103 45 656

(51) Int. Cl.
    *G03B 1/22*    (2006.01)
(52) U.S. Cl. .................. 352/191; 352/224; 352/229
(58) Field of Classification Search .............. 352/184, 352/191–196, 224, 229, 230; 226/62–73
    See application file for complete search history.

(56) References Cited

U.S. PATENT DOCUMENTS

| | | | | |
|---|---|---|---|---|
| 3,756,491 A | * | 9/1973 | Moriyama et al. | ............ 226/67 |
| 4,143,952 A | * | 3/1979 | Katahira et al. | ............. 352/221 |
| 4,235,534 A | * | 11/1980 | Beauviala | .................... 352/191 |
| 4,702,577 A | * | 10/1987 | Weigert | ...................... 352/191 |
| 5,184,158 A | * | 2/1993 | Grosser | ...................... 352/226 |
| 5,225,860 A | * | 7/1993 | Blaschek | .................... 352/192 |
| 5,266,979 A | * | 11/1993 | Brown et al. | ................ 352/224 |
| 5,402,166 A | | 3/1995 | Mead et al. | |

(Continued)

FOREIGN PATENT DOCUMENTS

DE    40 13 909 A1    10/1991

(Continued)

OTHER PUBLICATIONS

International Search Report, dated Feb. 28, 2005, corresponding to PCT/DE2004/002154 .

(Continued)

*Primary Examiner*—William C Dowling
(74) *Attorney, Agent, or Firm*—Christie, Parker & Hale LLP

(57) ABSTRACT

A film-feeding mechanism is provided having at least one conveying claw for intermittently transporting a motion picture film that is provided with perforations which extend parallel to the lateral edges thereof. Said film-feeding mechanism further includes at least one locking claw whose tips engage into a perforation in order to ensure picture steadiness, and a film-guiding device that aligns the motion picture film. Lateral film-guiding elements of the film-guiding device are disposed so as to be at least partly movable relative to the lateral edges of the motion picture film.

13 Claims, 3 Drawing Sheets

U.S. PATENT DOCUMENTS

| | | | |
|---|---|---|---|
| 6,137,530 A * | 10/2000 | Brown | 348/96 |
| 7,367,676 B2 * | 5/2008 | Trauninger | 352/166 |
| 7,393,105 B2 * | 7/2008 | Bauer et al. | 352/221 |
| 7,566,136 B2 * | 7/2009 | Kehrer | 352/168 |
| 2002/0171808 A1 * | 11/2002 | Quiroz | 352/221 |

FOREIGN PATENT DOCUMENTS

| | | | |
|---|---|---|---|
| GB | 783 568 A | 9/1957 | |
| GB | 783568 | 9/1957 | |

OTHER PUBLICATIONS

English translation of International Preliminary Examination Report for corresponding PCT application No. PCT/DE 2005/002154

* cited by examiner

FILM-FEEDING MECHANISM

CROSS-REFERENCE TO RELATED APPLICATION

This application is a National Phase Patent Application of International Application Number PCT/DE2004/002154, filed on Sep. 22, 2004, which claims priority of German Patent Application Number 103 45 656.2, filed on Sep. 25, 2003.

BACKGROUND

The invention relates to a film-feeding mechanism having at least one transport claw for the intermittent transport of a motion picture film and at least one locking claw to ensure picture steadiness.

The German Patent Application No. DE 40 13 909 A1 discloses a film-feeding mechanism for a motion picture film recording camera having a film guide which has two lateral film guide skids, along which the edge of a motion picture film slides with its film perforations. Located on the optical axis of the motion picture film recording camera is a picture cut-out or picture window which is opened intermittently by opening and closing an iris shutter or a rotating rotary shutter, so that the motion picture film transported intermittently on the film guide is exposed in the region of the picture window.

The claw mechanism of the film-feeding mechanism provided for the film transport has transport claws dipping into the film perforation for the intermittent transport of the motion picture film, and locking claws which, after an intermittent film transport step by the transport claws corresponding to the exposure frequency of the motion picture film, dip into the film perforation with a locking claw tip in order to correct and secure the picture steadiness. During the intermittent transport of the motion picture film, the transport claw tips describe an intrinsically closed crank loop, during which the transport claw tips initially dip into the film perforation, then carry out the film transport step, slip out of the film perforation again and return into their initial position. At the reversal points of the crank loop of the transport claws, the locking claw tips, describing an oscillatory movement, dip into the film perforation at high speed, perform a possible correction of the alignment of the motion picture film in the plane of the film and secure the picture steadiness of the motion picture film during the exposure of a film picture. Following the exposure of a film picture of the motion picture film, they are drawn out again, so that the motion picture film is released for a further film transport step.

Both the dipping of the transport claw tips and locking claw tips and the transfer from the transport claw tips to the locking claw tips and vice versa require, in addition to exact coordination of the kinematics of the transport claws and locking claws, exact alignment with the film perforation if undesired noise occurs as a result of transport and locking claw tips not dipping exactly into the film perforation or as a result of a lack of time coordination of the movement of the transport and locking claws. Furthermore, it is also possible for damage to occur to the film perforation or to the surface of the motion picture film.

For the exact alignment of the transport and locking claw tips with the film perforation and for the correct transfer from the transport claw tips to the locking claw tips, the knowledge of the dimensions of the motion picture film and its tolerances is imperative. For instance, in the case of a 35 mm unexposed film to DIN 15502, the width of the unexposed film is 34.97 mm with a tolerance of ±0.03 mm, the pitch between two successive perforation holes is 4.74 mm with a tolerance of ±0.01 mm, and the spacing of the outer edge of the perforation holes from the lateral edge of the motion picture film is 2 mm with a tolerance of ±0.07 mm. Although these film tolerances do not occur within a reel of unexposed film, they certainly occur from reel of film to reel of film, depending on the production batch or the unexposed film type or type of use, such as "indoor film", "daylight film" or the like.

To minimize noise, it is known to optimize the transfer from the locking claws to the transport claws in such a way that, by a stepwise claw adjustment or "pitch adjustment", a flexible lifting adjustment and transfer adapted to the motion picture film is carried out from the locking claws to the transport claws. This pitch adjustment ensures noise-optimized film transport, since the transport claws themselves, even in the case of a shrunken motion picture film, can stick in exactly, transport and stick out on their optimum claw curve. Because of the tolerances mentioned above, for example in the case of a motion picture film that has shrunk by 0.01 mm per perforation spacing, the insertion of the transport claw tips has to be adjusted by 0.02 mm and, at the same time, the stroke of the transport claws also has to be reduced by 0.05 mm, for example. This adjustment is made on an operating element connected to the lifting eccentric of the film transport mechanism, known as a "pinch adjust", which converts the vertical adjustment into an approximately horizontal displacement of the lifting eccentric in the 1/100 mm range.

Despite this known measure of pitch adjustment, disruptive noises and damage to the film perforation or to the surface of the motion picture film continue to occur during film transport, which are intended to be avoided or minimized by the present invention.

SUMMARY

It is therefore an object of the present invention to specify a film-feeding mechanism of the type mentioned at the beginning which further reduces the noise occurring during film transport and prevents damage to the film perforation or the surface of the motion picture film.

BRIEF DESCRIPTION

The solution according to the invention reduces the noise occurring during film transport as far as the unavoidable, minimal film-feeding noise and prevents the occurrence of damage to the film perforation or to the surface of the motion picture film, at least in the motion picture film regions containing the film scenes.

The solution according to the invention is based on the finding that the formation of noise and damage to the film perforation and surface of the motion picture film during film transport can be attributed not only to the alignment of the transport claw tips and the transfer from the locking claw tips to the transport claw tips but also to the fact that the locking claw tips dipping into the film perforation after a film transport step in order to position the motion picture film in front of a picture window and in order to ensure the picture steadiness before the exposure of a film picture in a motion picture film recording camera or in order to shine through the film picture in a film projector, do not dip into the relevant perforation holes of the motion picture film in an aligned manner in the event of inexact alignment with the film perforation but at least to some extent strike the edge surrounding the film perforation holes, which not only causes the disruptive noise development, which is particularly disadvantageous in film recording cameras associated with sound recordings, but can also lead to damage to the surface of the motion picture film or the film perforation.

When aligning the locking claw tips exactly with the perforation holes of the motion picture film, inter alia the film tolerances mentioned above have to be noted, in particular the spacing between the film perforation and the lateral edges of the motion picture film which, depending on the manufacturer, depend the manufacturing time and on the type and type of use of the unexposed film. As a result, constant deviations necessarily occur between the film side guide and the film perforation in the region of the picture window of the motion picture camera.

However, since the lateral film guide, as a part as a part of the film-feeding mechanism, correlates with the alignment of the claw tips, in particular with respect to the locking claw tips, continual or repeated striking of the locking claw tips on the side edges of the film perforation or on the surface of the motion picture film surrounding the film perforation holes occurs. This causes permanent noise and, despite close tolerances of the spacing between the lateral edges of the motion picture film and the film perforation, can lead to considerable damage to the film perforation.

These problems therefore occur in particular with regard to the locking claw tips, since, in the case of a double-sided locking claw, one of the two locking claw tips completely fills a film perforation hole of a film perforation (perforation hole 920 according to FIG. 3) with lateral play in terms of height, that is to say in the longitudinal direction of the motion picture film, while, in the case of a double-sided locking claw, the other locking claw tip or, in the case of a single-sided locking claw, the individual locking claw tip, fills a film perforation hole (perforation hole 910 according to FIG. 3) completely both in terms of height and in terms of width for the purpose of the exact alignment and adjustment of the motion picture film in relation to the picture window.

At least with respect to the last-named locking claw tip, each change in the spacing of the film perforation from the film lateral edge which, in the case of known film-feeding mechanisms, is formed by a lateral run-on blade, against which the motion picture film is pretensioned, leads to the locking claw tip(s) striking the edge of a perforation hole or the surface of the motion picture film, because of the fixed spacing of the locking claw tip(s) from the lateral film guide of the film-feeding mechanism.

As a result of the ability to adjust the position, and in particular as a result of the adjustment of the position of at least part of the lateral film guide in relation to and in particular perpendicular to the lateral edges of the motion picture film, before a film exposure by a motion picture film recording camera or in order to project a motion picture film by a film projector, the film perforation of the motion picture film is aligned in relation to the claw mechanism in such a way that exact dipping of the locking claw tips, in particular of the locking claw tip filling the film perforation holes completely, subsequently occurs. Since the spacing of the film perforation from the lateral edges of the motion picture film is constant in one film reel, that is to say one film batch, and therefore no deviations in the spacing between the lateral edges of the motion picture film and the film perforation subsequently occur, exact alignment, in particular of the locking claw tip(s) in the film perforation is ensured and it is therefore ensured that no noise or damage is caused by the locking claw tip(s) striking the lateral edges of the film perforation or the surface of the motion picture film.

An exemplary embodiment of the solution according to the invention comprises the adjustable part of the lateral film guide having at least two lateral film guide elements spaced apart from each other.

The disposal of mutually spaced, laterally adjustable lateral film guide elements of the continuous lateral film guides reduces the friction on the lateral edges of the motion picture film, at the same time with exact alignment of the film perforation, in particular in relation to the locking claw tip(s) of the claw mechanism.

The lateral film guide elements can either be adjusted individually in relation to the lateral edges of the motion picture film or the lateral film guide elements in each case assigned to one lateral edge of the motion picture film are adjusted together in relation to the lateral edges of the motion picture film.

A first pair of lateral film guide elements is preferably disposed opposite each other at the picture center of a picture window of the film-feeding mechanism. As an addition to this, a second pair of lateral film guide elements can be disposed opposite each other in the film transport direction at a distance from the first pair of lateral film guide elements.

In the arrangement of the lateral film guide elements mentioned above, the locking claw tip of an individual locking claw or the locking claw tips of a double-sided locking claw dips or dip into the film perforation between the two pairs of lateral film guide elements and, in the film transport direction, preferably immediately behind or in front of the picture window.

The length of the lateral film guide elements is dimensioned such that it corresponds at least to the spacing of two perforation holes of the film perforation.

The film guide or lateral film guide elements can either be adjusted manually by at least one setting screw accessible from a wall of the film-feeding mechanism or automatically by a self-adjusting device.

A method for aligning the film guide of a motion picture film, which is transported intermittently by a film-feeding mechanism having at least one transport claw and which has at least one film perforation parallel to the lateral edges, into which perforation at least one locking claw dips with a locking claw tip in order to secure the picture steadiness is characterized in that the position of the film guide is changed during the film transport, at least to some extent perpendicular to the lateral edges of the motion picture film.

Changing the position of the film guide during the film transport permits easier adjustment of the positioning of the film perforation for the alignment with the locking claw tips dipping into the film perforation and creates the precondition for easy manual or automatic positioning and alignment of the film guide by a suitable sensor.

This sensor senses the noise produced during the film transport or the vibrations caused by the film transport being registered and the position and alignment of the film guide can be changed manually by an operator, for example by actuating the setting screw, in the direction of minimizing the noise and vibration.

As alternative to this, a control device can be provided, which registers the noise and/or vibrations produced during the film transport as an actual value and, by predefining appropriate actuating variables to the film guide, reduces the noise and/or vibrations to a minimum.

BRIEF DESCRIPTION OF THE DRAWINGS

The idea on which the invention is based is to be explained in more detail by using an exemplary embodiment illustrated in the drawing, in which.

DETAILED DESCRIPTION

Figure 1:
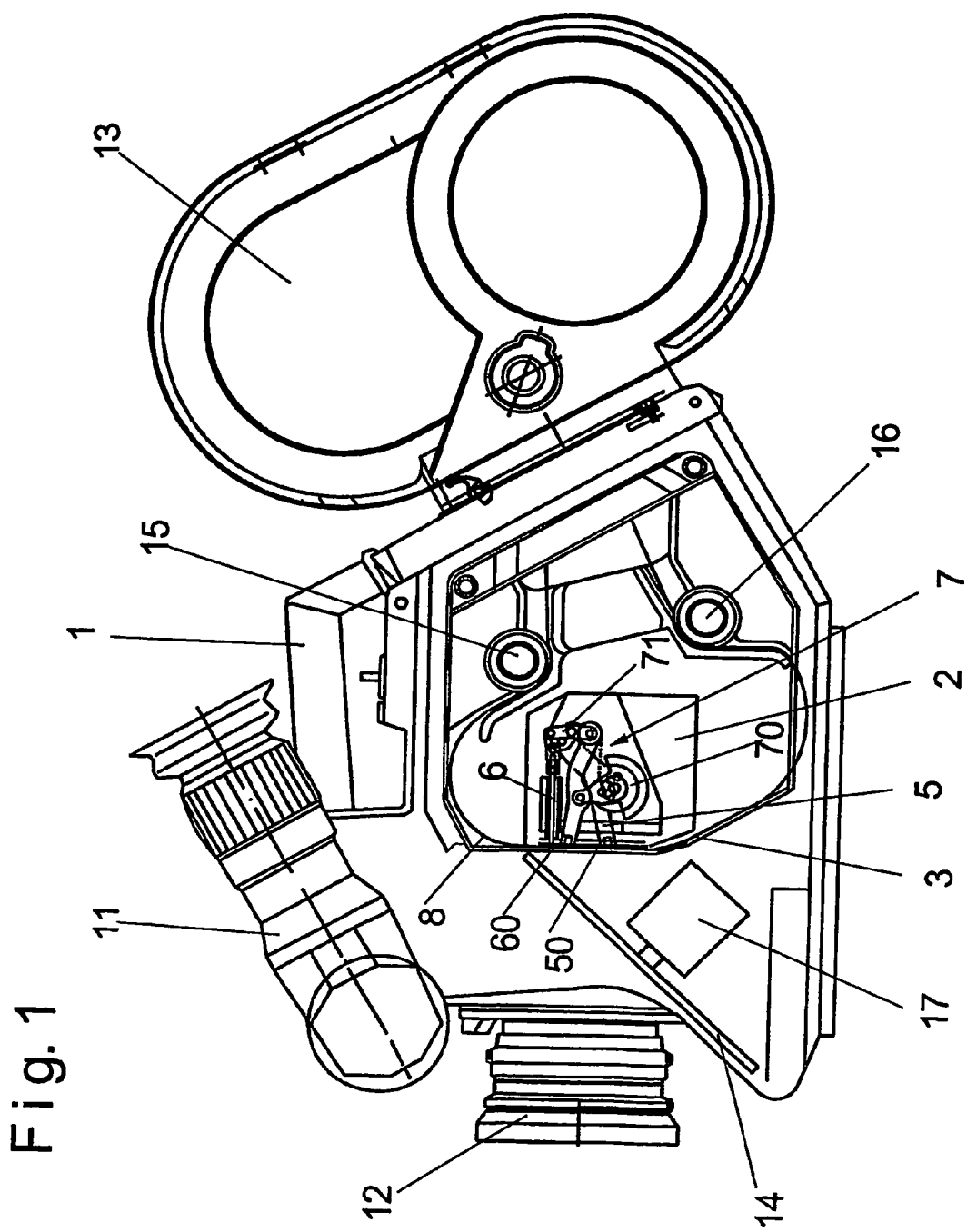
FIG. 1 shows a side view of a motion picture film recording camera with a longitudinal section through its film-feeding mechanism.

FIG. 1 shows a motion picture film recording camera having a camera housing 1, a viewfinder eyepiece 11, a camera objective 12 and a film cassette 13 attached to the camera housing 1, in which a film supply reel having an unexposed motion picture film 8 and a film winding reel with the motion picture film exposed by the motion picture film recording camera are disposed. The camera housing 1, illustrated as partly open, contains a film feed sprocket 15 and a film winding sprocket 16, which unwind the motion picture film 8 continuously from the film supply reel of the film cassette and wind it continuously onto the film winding reel of the film cassette 13.

Figure 2:
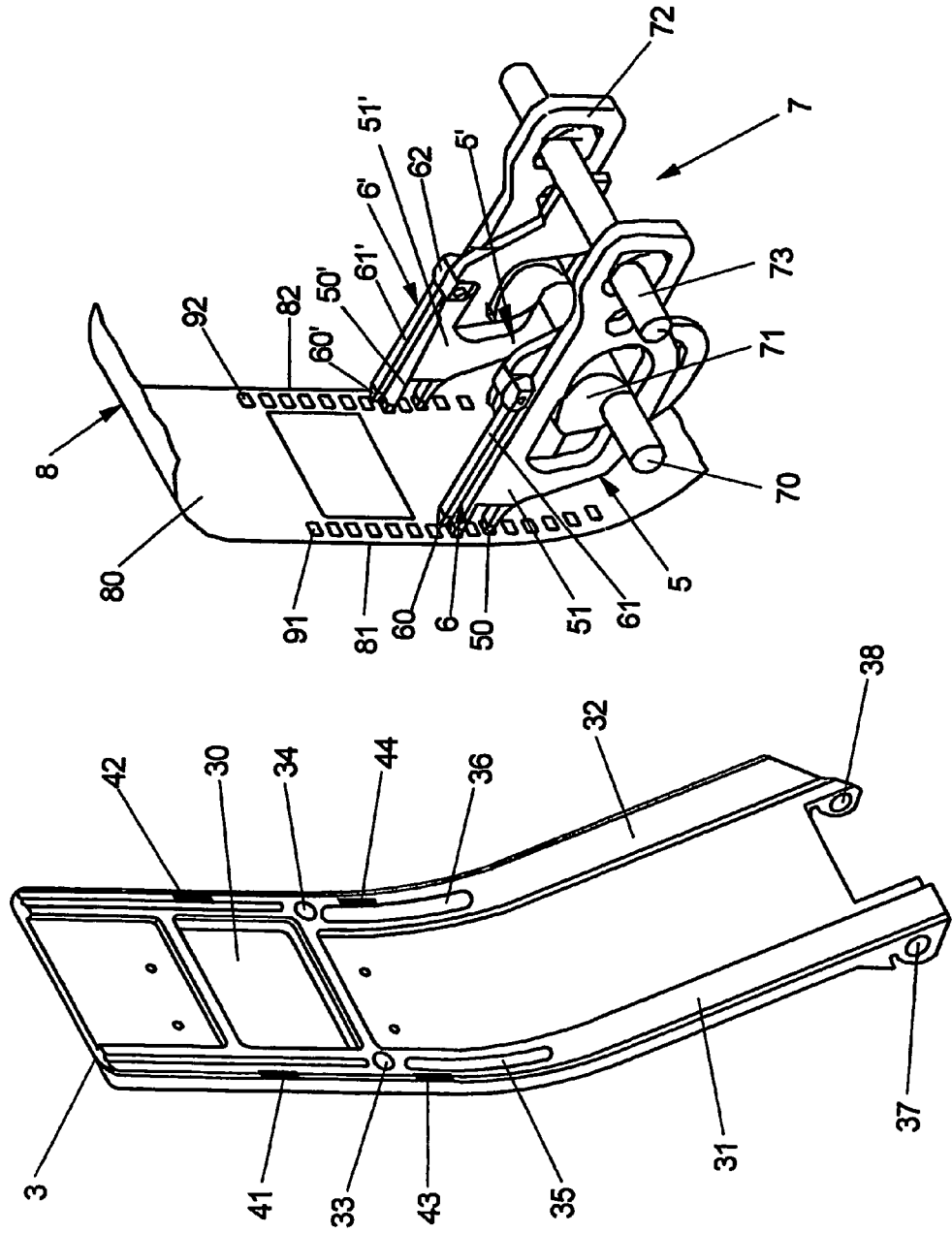
FIG. 2 shows a schematic perspective exploded illustration of the film guide and of the claw mechanism of the film-feeding mechanism according to FIG. 1.

A claw mechanism 5, 5', 6, 6', 7 illustrated in a side view in FIG. 1 and in a schematic perspective view in FIG. 2 and disposed in a film-feeding mechanism 2 moves the motion picture film 8 intermittently past a picture window 30 of a film guide 3, where the motion picture film 8 in the transport phase of the claw mechanism 5, 5', 6, 6', 7 is covered by a sector-shaped shutter disk of a rotating rotary shutter 14 and is exposed by a sector-shaped cut-out from the shutter disk of the rotating rotary shutter 14 in order to expose a film picture. The sector-shaped shutter disk of the rotating rotary shutter 14 is driven by a shutter motor 17, which is coupled electrically to the drive motor of the film-feeding mechanism 2, so that the speed of the two motors runs synchronously. Alternatively, a direct mechanical coupling can be provided, in which the rotating rotary shutter 14 is connected via a gear mechanism to the claw mechanism 5, 5', 6, 6', 7 of the film-feeding mechanism 2.

In order to compensate for the continuous film movement effected by the two sprockets 15, 16 and the intermittent film movement effected by the claw mechanism 5, 5', 6, 6', 7, film loops are formed on both sides of the picture window 30.

According to FIGS. 1 and 2, the claw mechanism 5, 5', 6, 6', 7 is used to transport and to secure the picture steadiness of the motion picture film 8 and, to this end, has two transport claws 5, 5' and two locking claws 6, 6' assigned to the transport claws 5, 5', of which the tips dip into the perforation holes of the film perforation 91, 92. Alternatively, in the case of a motion picture film 8 perforated on one side, in each case one transport claw 5 and one locking claw 6 are provided. Furthermore, the claw mechanism 5, 5, 6, 6', 7 contains a claw drive 7 having a drive shaft 70, which is connected to a film transport motor, not specifically illustrated, a crank 71 and a controller 72. The transport claws 5, 5' and locking claws 6, 6' are formed as dipping claws and, at their ends facing the motion picture film 8, have left-hand and right-hand transport claw tips 50, 50' and left-hand and right-hand locking claw tips 60, 60', which dip alternately into the perforation holes of the film perforations 91, 92 of the motion picture film 8. The transport claws 5, 5' have a transport claw tongue 51, 51' at one end of which the transport claw tips 50, 50' are disposed and of which the other ends are connected to the control element 72, which swivels about a control element axis 73 or rotates about this control element axis 73. A center section of the transport claw tongues 51, 51' is connected via a claw joint to a crank arm of the crank 71 and the latter is attached via a crank joint to the drive shaft 70.

The locking claws 6, 6' contain left-hand and right-hand locking claw pins 61, 61', at one end of which the left-hand and right-hand locking claw tip 60, 60' is arranged and the other ends of which are connected via locking claw tongues to a locking claw lever 62, which is attached to the control arm 72 via an attachment.

During a film transport step, the transport claws 5, 5' carry out a horizontal and vertical movement, the transport claw tips 50, 50' passing through an elongated, self-contained curve and, at one end of the curve, dipping into the perforation holes of the film perforations 91, 92 and leaving the latter again at the other end, so that the spacing of the two reversal points determines the stroke length of the transport claws 5, 5' and therefore a film transport step.

By connecting the transport claw tongues 51, 51' and the locking claw lever 62 with different attachment points to the control element 72, a horizontal movement of the transport claw tips 50, 50' and of the locking claw tips 60, 60' in opposite directions is effected, so that, during a film transport step, in which the motion picture film 8 is moved onward by one film picture, the locking claw tips 60, 60' are located outside the plane 80 of the film, while the transport claw tips 50, 50' have dipped into the film perforations 91, 92 and move the motion picture film 8 in accordance with the predefined stroke length between the upper and lower reversal points.

Following the completion of a film transport step, the transport claw tips 50, 50' leave the film perforations 91, 92 and the locking claw tips 60, 60' dip into a film perforation hole of the film perforations 91, 92 which is aligned with the locking claw tips 60, 60' and ensure fixed picture steadiness of the motion picture film 8, of which the part to be exposed is positioned in front of the picture window 30 which, during the exposure of the motion picture film 8 is opened by the rotating rotary shutter 14 disposed in front of the picture window 30.

According to FIG. 2, the film guide 3 comprises two lateral film supports 31, 32, along which the edge of the motion picture film 8 slides with the film perforations 91, 92 provided on both sides, parallel to the lateral edges 81, 82 of the motion picture film 8. In order to insert the film guide 3 into the film-feeding mechanism 2, sprung balls 37, 38, which latch into corresponding receptacles in the film-feeding mechanism 2 with a form and force fit, are provided at the lower end of the film guide 3. For the transport claw tips 50, 50', two grooves 35, 36 are provided in the film running surface of the film guide 3, while underneath the picture window 30 there are disposed two holes 33, 34, into which the locking claw tips 60, 60' can dip.

A precondition for correct picture steadiness, i.e. a constant spacing of two successive film pictures to be exposed, is exact maintenance of the stroke length of the transport claws 5, 5' in the film transport direction and therefore exact positioning of the perforation holes in the extension of the locking claw tips 60, 60', in order that the latter dip into a perforation hole aligned with them and do not strike an edge above or below a perforation hole of the film perforations 91, 92 or even a film land between two perforation holes as a result of faulty positioning of the motion picture film 8. Faulty positioning of the motion picture film 8 by the transport claws 5, 5' would thus lead to noise and possibly to considerable damage to the motion picture film 8. In order to avoid this, a "pitch adjust" described at the outset is provided for the exact setting of the film transport steps.

Besides the exact positioning of the motion picture film 8 in the film transport direction, however, exact positioning of the film perforations 91, 92 perpendicular to the film transport direction in the plane of the surface 80 of the motion picture film 8 is necessary in order that the locking claw tips 60, 60' do not strike the edges on the right or left beside the perforation holes of the film perforations 91, 92 and, as a result, likewise produce noise and cause damage to the motion picture film 8. The exact lateral positioning of the film perforations 91, 92 depends substantially on the lateral spacing of the film perforations 91, 92 from the lateral edges 81, 82 of the motion picture film 8, since the locking claw tips 60, 60' of the locking claws 6, 6', these locking claw tips dipping into the film perforations 91, 92, have a predefined, exact spacing in relation to the lateral guidance of the film guide 3, on which the lateral edges 81, 82 of the motion picture film 8 bear during film transport and when the picture is steady.

If the spacing between the lateral edges 81, 82 of the motion picture film 8 and the film perforations 91, 92 changes, because of the no longer exactly aligned disposition of the perforation holes of the film perforations 91, 92, the locking claw tips 60, 60' would strike the edges of the perforation holes or the surface 80 of the motion picture film 8 beside the perforation holes and therefore cause the aforementioned noise and possibly damage to the motion picture film 8. While right-hand locking claw tip 60' is of relatively narrow design and, accordingly, fills the perforation holes 920 according to FIG. 3 completely in terms of height but with play laterally, the cross-sectional area of the left-hand locking claw tip 60 coincides with the cross-sectional area of the perforation holes 910 according to FIG. 3 and consequently fills the perforation holes 910 when it dips into the perforation holes of the film perforation 91.

For this reason, a changed spacing of the film perforations 91, 92 from the lateral edges 81, 82 of the motion picture film 8 with respect to the one, right-hand locking claw 60' filling the perforation holes only in terms of height because of the lateral play would possibly still not lead to any development of noise or damage to the motion picture film 8 but the left-hand locking claw tip 60 would certainly not be aligned with the film perforation 91 and consequently would strike the edges of the perforation holes 910 or the surface 80 of the motion picture film 8.

Since the approved tolerances and therefore varying spaces between the lateral edges 81, 82 of the motion picture film 8 and the film perforations 91, 92 do not occur within one reel of film but, as a result of production between different production processes, occur in different reels of film, a single adjustment of the spacing between the lateral film guide of the film guide 3 and the locking claws 6, 6' offers the possibility of adjusting the locking claw tips 60, 60' so as to be aligned exactly with the film perforations 91, 92 and therefore to forestall any development of noise and therefore damage to the motion picture screen 8.

Accordingly, the lateral film guides of the film guide 3 are designed to be adjustable laterally and in each case comprise lateral film guide elements 41, 42 and 43, 42 disposed in pairs on the left-hand and right-hand edge of the film guide 3. The ability of the lateral film guide elements 41 to 44 to be adjusted laterally can be provided, for example, via an eccentric or spindle arrangement, which is led out as far as the wall of the film-feeding mechanism 2 and can be actuated by an adjusting screw or the like.

Figure 3:
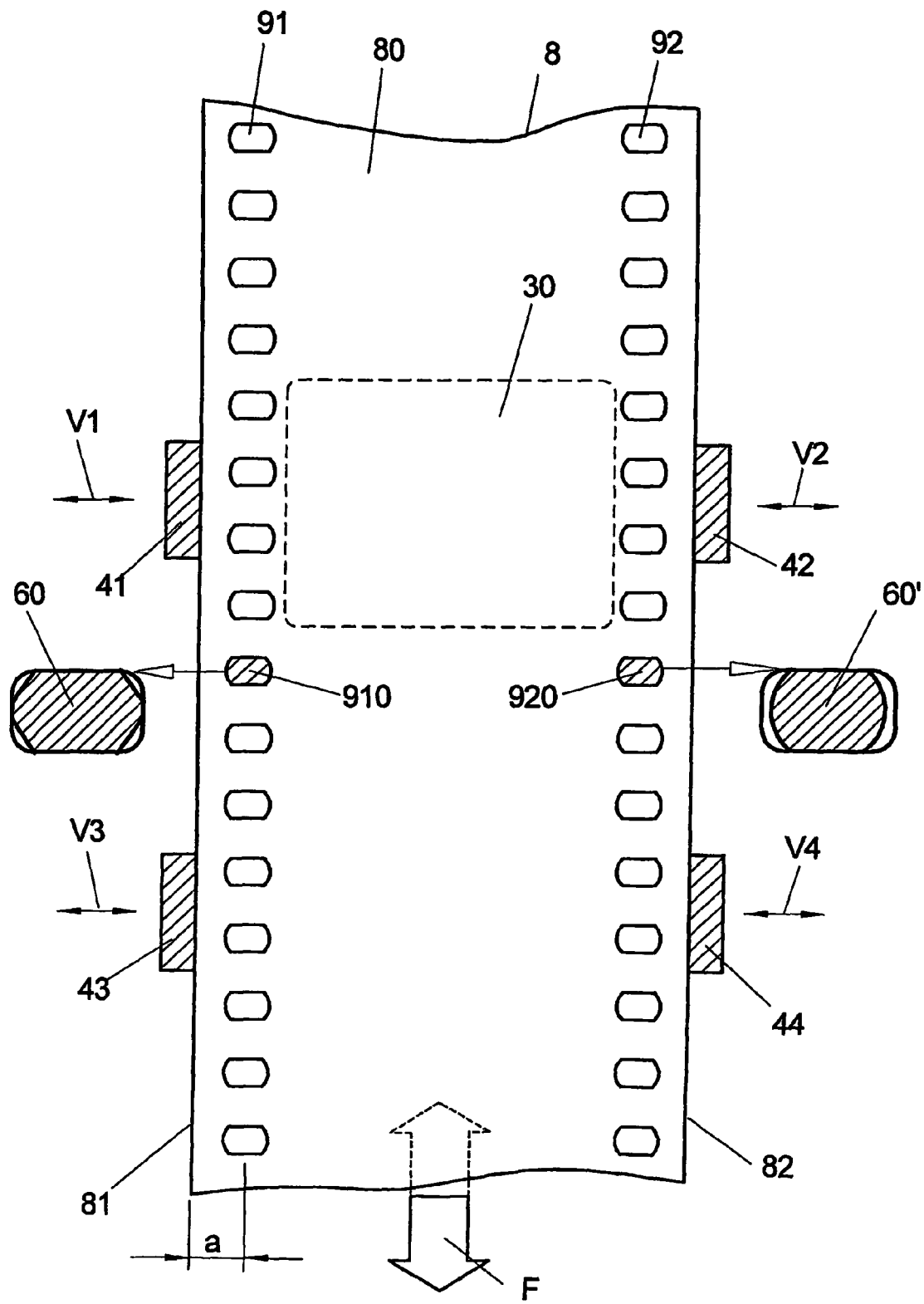
FIG. 3 shows a plan view of a section of a motion picture film, on the lateral edges of which adjustable lateral film guide elements bear.

FIG. 2 shows the assignment of the lateral film guide elements 41 to 44 to the lateral edges 81, 82 of the motion picture film 8 disposed between the lateral film guides in a perspective view and FIG. 3 shows it in a plan view. As FIG. 3 makes clear, the lateral film guide elements 41 to 44 have a length in the film transport direction F such that they cover at least two perforation holes of the film perforation 91, 92 and can be adjusted laterally in the direction of the arrows V1 to V4, i.e. perpendicular to the film transport direction F, so that the film perforations 91, 92, which have a constant spacing a in relation to the lateral edges 81, 82 of the motion picture film 8, can likewise be displaced laterally.

This ensures that the locking claw tip 60 of the left-hand locking claw 6 can dip completely with exact alignment into the perforation hole 910 of the left-hand film perforation 91 and in the process fills the perforation hole 910 completely both in terms of width and in terms of height, while the locking claw tip 60' of the right-hand locking claw 6' dips into the perforation hole 920 of the right-hand film perforation 92 without striking a lateral edge of the perforation hole 920 as it fills the perforation hole completely in terms of height, that is to say in the film transport direction.

One pair of mutually opposite lateral film guide elements 41, 42 is aligned with the picture center of the picture window 30, while the other pair of lateral film guide elements 43, 44 is disposed at a distance from the first pair of lateral film guide elements 41, 42 such that the locking claw tips 60, 60' dip into the perforation holes 910, 920 of the film perforations 91, 92 between the two pairs of lateral film guide elements 41 to 44.

The adjustment of the lateral film guide elements 41 to 44 can optionally be carried out individually in relation to each of the lateral film guide elements 41 to 44 or together for each side, that is to say the lateral film guide elements 41 and 43 and, respectively, 42 and 44 are adjusted together for the purpose of adjustment. As a result, it is also possible to compensate for width tolerances of the motion picture film 8, it being ensured that, in particular, the locking claw tip 60 filling a perforation hole 910 with its entire cross section is aligned exactly with the film perforation 91.

Of course, the disposition and number of the lateral film guide elements 41 to 44 is not restricted to the exemplary embodiment illustrated in FIGS. 2 and 3; instead it is also possible for further lateral film guide elements to be provided or for their cross-sectional shape and length in the film transport direction F to be varied.

The adjustment of the film guide 3 can be carried out both manually and automatically. In the manual variant, a setting screw is preferably provided which, for example, acts on the lateral film guide elements 41 to 44 via a worm drive mechanism and effects appropriate alignment of the motion picture film 8.

The manual positioning of the film guide 3 is preferably carried out during the transport of the motion picture film 8. Transport noise occurring points to the locking claw tips 60, 60' striking the perforation edges or the lateral edge of the motion picture film 8, so that, by an appropriate change in the position and/or alignment of the lateral film guide elements 41 to 44, the motion picture film 8 is guided in such a way that, in particular, the locking claw tips 60, 60' dip into the perforation holes of the film perforation 91, 92 without contact or virtually without contact.

As an alternative to this, control of the positioning of the film guide 3 can be provided, in which the noise and/or vibrations occurring during the film transport are registered.

Depending on the registered film transport noise and/or the vibrations occurring during the film transport, the position and/or alignment of the lateral film guide elements 41 to 44 is changed in such a way that the film transport noise produced and/or vibrations occurring during the film transport are minimized, so that it is ensured that, in particular, the locking claw tips 60, 60' are aligned with the perforation area of the film perforation 91, 92 and do not strike the edges of the perforation holes or the edge of the motion picture film 8 surrounding the film perforation 91, 92.

A further alternative is a semiautomatic solution, in which the noise produced or vibrations occurring during the film transport are registered and displayed optically, so that an operator can reduce the noise displayed optically and/or the vibrations displayed optically to a minimum by changing a setting screw acting on the lateral film guide elements 41 to 44.

The invention claimed is:

1. A film-feeding mechanism comprising:
   at least one transport claw for the intermittent transport of a motion picture film, parallel to the lateral edges of which at least one film perforation is provided,
   at least one locking claw which dips into the film perforation with a locking claw tip and
   a film guide aligning the motion picture film,
   wherein the position of the film guide is changeable in relation to the lateral edges of the motion picture film, and
   wherein a first pair of lateral film guide elements is disposed opposite each other at the picture center of a picture window of the film guide, and
   wherein a second pair of lateral film guide elements is disposed opposite each other in the film transport direction at a distance from the first pair of lateral film guide elements.

2. The film-feeding mechanism as claimed in claim 1, wherein the changeable part of the film guide is adjustable perpendicular to the lateral edges of the motion picture film.

3. The film-feeding mechanism as claimed in claim 1, wherein one of the changeable and adjustable part of the film guide comprises at least two lateral film guide elements spaced apart from each other.

4. The film-feeding mechanism as claimed in claim 3, wherein the lateral film guide elements are adjustable individually in relation to the lateral edges of the motion picture film.

5. The film-feeding mechanism as claimed in claim 3, wherein the lateral film guide elements in each case assigned to one lateral edge of the motion picture film are adjustable in relation to the lateral edges of the motion picture film.

6. The film-feeding mechanism as claimed in claim 1, wherein one of the locking claw tip and the locking claw tips dips or dip into the film perforation between the two pairs of lateral film guide elements.

7. The film-feeding mechanism as claimed in claim 6, wherein one of the locking claw tip and the locking claw tips dips or dip into the film perforation immediately behind or in front of the picture window in the film transport direction.

8. The film-feeding mechanism as claimed in claim 1, wherein the sides of the lateral film guide elements on the lateral edges of the motion picture film have a minimum length which corresponds to the spacing of two perforation holes of the film perforation.

9. The film-feeding mechanism as claimed in claim 1, wherein the lateral film guide elements are adjustable manually by at least one setting screw accessible from a wall of the film-feeding mechanism.

10. The film-feeding mechanism as claimed in claim 1, wherein the lateral film guide elements are adjustable automatically by a self-adjusting device.

11. A method for aligning the film guide of a motion picture film, which is transported intermittently by a film-feeding mechanism having at least one transport claw and which has at least one film perforation parallel to its lateral edges, into which perforation at least one locking claw dips with a locking claw tip, the method comprising:
    changing the position of the film guide during the film transport perpendicular to the lateral edges of the motion picture film, wherein the position of the film guide is changed automatically by a control device, which is supplied with an actual value signal which corresponds to one of a noise produced and vibrations occurring during the film transport and which outputs an actuating variable minimizing the noise or vibrations to the film guide.

12. The method as claimed in claim 11, wherein changing the position of the film guide comprises changing the position of the film guide in response to vibrations generated during film transport.

13. The method of claim 11, wherein changing the position of the film guide comprises changing the position of the film guide in response to the noise generated during film transport.

* * * * *